United States Patent
He et al.

(10) Patent No.: US 11,620,017 B2
(45) Date of Patent: Apr. 4, 2023

(54) TOUCH CONTROLLERS CAPABLE OF REDUCING NOISE INTERFERENCE

(71) Applicant: HIMAX TECHNOLOGIES LIMITED, Tainan (TW)

(72) Inventors: Jia-Ming He, Tainan (TW); Yaw-Guang Chang, Tainan (TW); Yi-Yang Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/326,317

(22) Filed: May 20, 2021

(65) Prior Publication Data
US 2022/0374100 A1 Nov. 24, 2022

(51) Int. Cl.
G06F 3/041 (2006.01)
G06F 3/044 (2006.01)

(52) U.S. Cl.
CPC .......... *G06F 3/0418* (2013.01); *G06F 3/0446* (2019.05); *G06F 2203/04107* (2013.01)

(58) Field of Classification Search
CPC ....... G06F 3/041; G06F 3/0418; G06F 3/0446
USPC .................................................. 345/173–174
See application file for complete search history.

(56) References Cited

U.S. PATENT DOCUMENTS

| | | | | |
|---|---|---|---|---|
| 10,795,488 B2* | 10/2020 | Krah | ...................... | G06F 3/0416 |
| 2008/0111714 A1* | 5/2008 | Kremin | .................. | G06F 3/0446 341/33 |
| 2014/0232691 A1* | 8/2014 | Lee | ........................ | G06F 3/0443 345/174 |
| 2015/0084876 A1* | 3/2015 | Schwartz | .............. | G06F 3/0446 345/173 |
| 2017/0090612 A1* | 3/2017 | Syed | ................... | G06F 3/04184 |

\* cited by examiner

*Primary Examiner* — Kwin Xie
(74) *Attorney, Agent, or Firm* — Winston Hsu (57) ABSTRACT

A touch controller coupled to a touch sensor panel and arranged to detect touch events on the touch sensor panel includes a sensing circuit. The sensing circuit includes an integrator circuit and a reference voltage controlling circuit. The integrator circuit includes a first input node coupled to a sensing node for receiving a sensing signal, a second input node coupled to a guard trace disposed adjacent to the touch sensor panel and an output node outputting an integrated signal. The reference voltage controlling circuit includes a switch coupled between the second input node of the integrator circuit and a voltage source providing a reference voltage. The switch is closed during a pre-charge period to charge a voltage on the guard trace to the reference voltage in beginning of a sensing period and is opened after the pre-charge period.

15 Claims, 5 Drawing Sheets

TOUCH CONTROLLERS CAPABLE OF REDUCING NOISE INTERFERENCE

BACKGROUND OF THE INVENTION

1. Field of the Invention

The invention is related to a touch controller, and more particularly, to a touch controller capable of reducing noise interference.

2. Description of the Prior Art

Many types of input devices are available for performing operations in a computing system, such as buttons or keys, mice, trackballs, touch sensor panels, joysticks, touch pads, touch screens, and the like. Touch sensitive devices, and touch screens, in particular, are becoming increasingly popular, especially in consumer electronic devices, because of their ease and versatility of operation as well as their declining price. Touch sensitive devices can include a touch sensor panel, which can be a clear panel with a touch sensitive surface, and a display device such as a liquid crystal display (LCD) that can be positioned partially or fully behind the touch sensor panel, or integrated with the touch sensor panel, so that the touch sensitive surface can substantially cover at least a portion of the viewable area of the display device. Touch sensitive devices can generally allow a user to perform various functions by touching or hovering over the touch sensor panel using one or more fingers, a stylus or other object at a location often dictated by a user interface (UI) including virtual buttons, keys, bars, displays, and other elements, being displayed by the display device. In general, touch sensitive devices can recognize a touch event and the position of the touch event on the touch sensor panel or a hover event and the position of the hover event on the touch sensor panel, and the computing system can then interpret the touch or hover event in accordance with the display appearing at the time of the event, and thereafter can perform one or more operations based on the event.

As the consumer electronic devices are becoming thinner and thinner, the distance between the touch sensor panel and the display panel is getting closer, and the parasitic capacitance between the two is getting larger. As a result, a great amount of noise will be generated and coupled to the touch sensor panel due to the large parasitic capacitance when the display panel is changing the screen. The noise will affect the accuracy of the recognition of touch or hover event, or may even cause the voltage of the sensing signal to increase and beyond the operation range of touch sensing circuit.

Therefore, a novel circuit design of a touch controller being capable of reducing noise interference is required to solve the aforementioned problem.

SUMMARY OF THE INVENTION

It is an objective of the invention to provide a novel circuit design of a touch controller being capable of reducing or even cancelling noise interference.

According to an embodiment of the invention, a touch controller coupled to a touch sensor panel and arranged to detect touch events on the touch sensor panel comprises a sensing circuit. The sensing circuit comprises an integrator circuit and a reference voltage controlling circuit. The integrator circuit comprises a first input node coupled to a sensing node for receiving a sensing signal, a second input node coupled to a guard trace disposed adjacent to the touch sensor panel and an output node, outputting an integrated signal. The reference voltage controlling circuit comprises a switch coupled between the second input node of the integrator circuit and a voltage source providing a reference voltage. The switch is closed during a pre-charge period to charge a voltage on the guard trace to the reference voltage in beginning of a sensing period and is opened after the pre-charge period.

According to another embodiment of the invention, a touch sensing device comprises a guard trace disposed adjacent to a touch sensor panel and a touch controller coupled to the touch sensor panel and arranged to detect touch events on the touch sensor panel. The touch controller comprises a sensing circuit. The sensing circuit comprises an integrator circuit and a reference voltage controlling circuit. The integrator circuit comprises a first input node coupled to a sensing node for receiving a sensing signal, a second input node coupled to a guard trace disposed adjacent to the touch sensor panel and an output node, outputting an integrated signal. The reference voltage controlling circuit comprises a switch coupled between the second input node of the integrator circuit and a voltage source providing a reference voltage. The switch is closed during a pre-charge period to charge a voltage on the guard trace to the reference voltage in beginning of a sensing period and is opened after the pre-charge period.

According to yet another embodiment of the invention, a touch sensing module comprises a touch sensor panel, a guard trace disposed adjacent to the touch sensor panel and a touch controller coupled to the touch sensor panel and arranged to detect touch events on the touch sensor panel. The touch controller comprises a sensing circuit. The sensing circuit comprises an integrator circuit and a reference voltage controlling circuit. The integrator circuit comprises a first input node coupled to a sensing node for receiving a sensing signal, a second input node coupled to a guard trace disposed adjacent to the touch sensor panel and an output node, outputting an integrated signal. The reference voltage controlling circuit comprises a switch coupled between the second input node of the integrator circuit and a voltage source providing a reference voltage. The switch is closed during a pre-charge period to charge a voltage on the guard trace to the reference voltage in beginning of a sensing period and is opened after the pre-charge period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
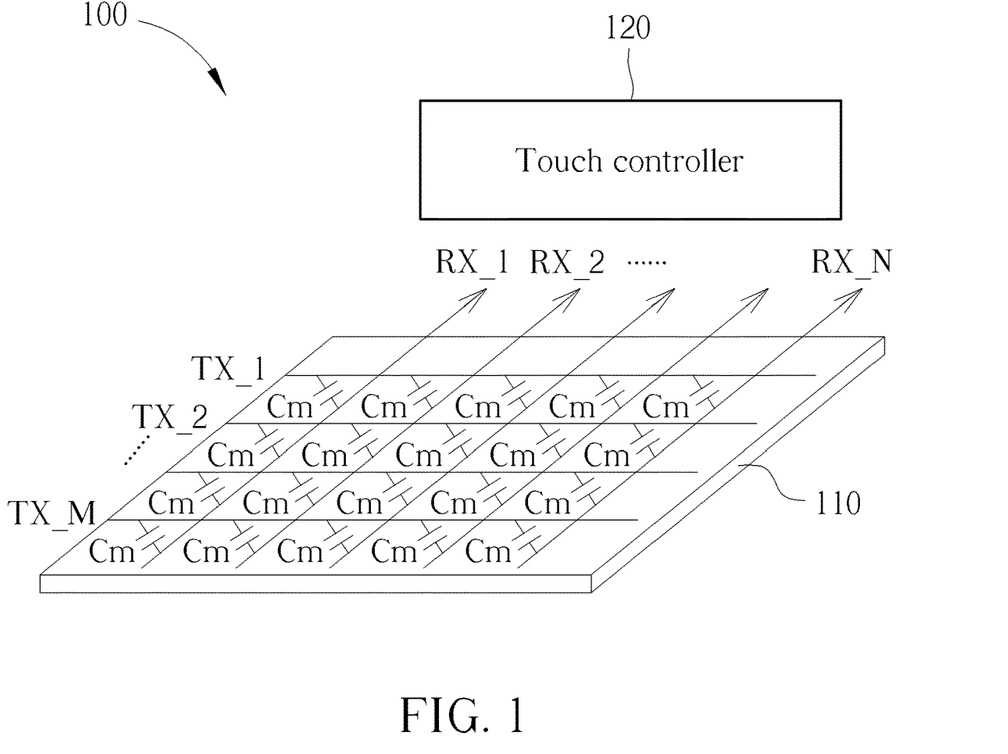
FIG. 1 shows an exemplary diagram of a touch sensing module according to an embodiment of the invention.

FIG. 1 shows an exemplary diagram of a touch sensing module according to an embodiment of the invention. The touch sensing module 100 may comprise a touch sensor panel 110 and a touch controller 120. The touch sensor panel 110 may comprise a touch screen which comprises a plurality of transmitting (TX) channels, such as the TX lines TX_1, TX_2, . . . TX_M shown in FIG. 1, a plurality of receiving (RX) channels crossing the TX channels, such as the RX lines RX_1, RX_2, . . . RX_N shown in FIG. 1, and a plurality of capacitors formed at the intersections of the TX lines and the RX lines, such as the capacitors Cm shown in FIG. 1.

The touch controller 120 is coupled to the touch sensor panel 110 and arranged to sense or detect touch events on the touch sensor panel 110. The touch sensing module 100 may further comprise a TX driving circuit (not shown in FIG. 1) arranged to supply a driving signal to each TX channel to facilitate the sensing or detection of the touch events. The touch controller 120 is coupled to the RX channels and arranged to receive a sensing signal indicative of a voltage or an amount of charge on the associated RX channel. The touch controller 120 may determine whether there is any touch event occurred on the touch sensor panel, and further recognize the touch events and the positions of the touch events on the touch sensor panel based on the voltage or the amount of charge on the associated RX channel, or the change in the voltage or the amount of charge.

The touch controller 120 may comprise a plurality of sensing circuits, each being coupled to a sensing node on one RX channel for receiving the sensing signal.

Figure 2:
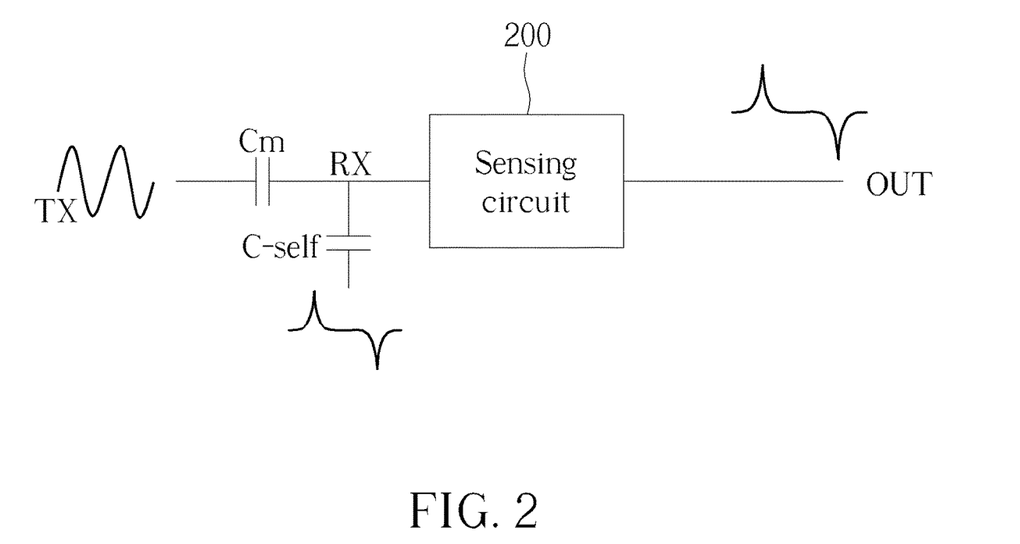
FIG. 2 shows an exemplary circuit diagram of the portion of the touch sensor panel coupled to a sensing circuit.

FIG. 2 shows an exemplary circuit diagram of the portion of the touch sensor panel coupled to a sensing circuit. As shown in FIG. 2, besides the capacitor Cm formed at the intersection of one TX line and one RX line, there is also another capacitor coupled to the sensing circuit 200, such as the capacitor C-self shown in FIG. 2. The capacitor C-self is a parasitic capacitor formed between the touch sensor panel and the display panel (not shown in FIG. 2).

When the display panel is changing the screen to be displayed, a great amount of noise, such as the noise 250 shown in FIG. 2, will be generated, and the noise will be coupled to the sensing node as well as an input node of the sensing circuit 200 via the capacitor C-self.

Figure 3:
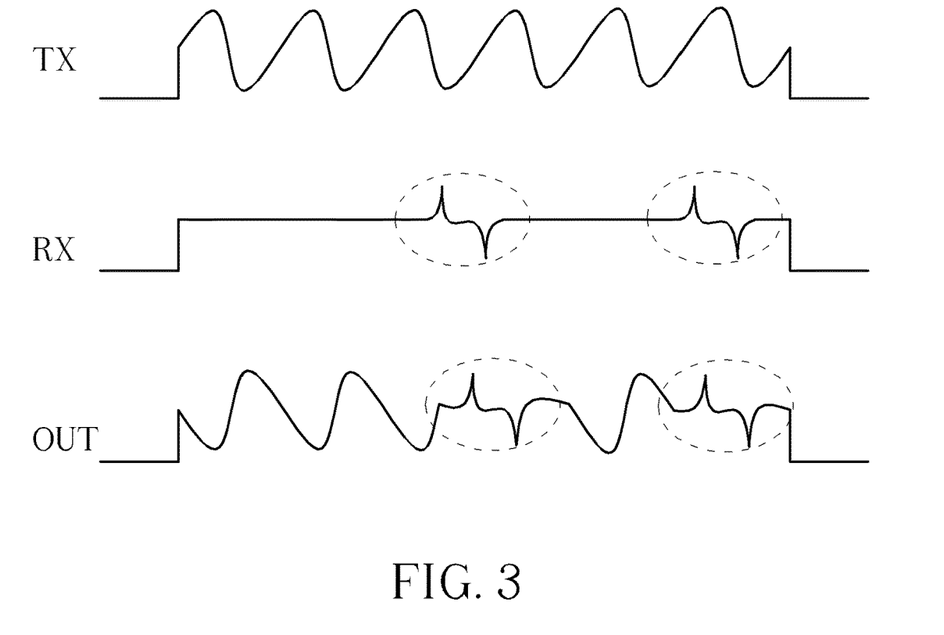
FIG. 3 shows exemplary signal waveforms of the signals on the TX line and the sensing node and of the signal output by the sensing circuit.

FIG. 3 shows exemplary signal waveforms of the signals on the TX line and the sensing node and signal waveform of the signal output by the sensing circuit 200. In FIG. 3, the signal labeled with the word "TX" is the driving signal supplied by the TX driving circuit onto a TX line, the signal labeled with the word "RX" is the sensing signal generated on the sensing node and received by the sensing circuit 200 and the signal labeled with the word "OUT" is the signal output by the sensing circuit 200. As shown in FIG. 3, the noise 250 will appear in the sensing signal received by the sensing circuit 200 as well as in the signal output by the sensing circuit 200, and will eventually affect the accuracy of the recognition of touch event. The larger the capacitance, the greater noise would be coupled to the sensing circuit.

Therefore, a novel circuit design for the touch controller being capable of reducing noise interference is required to solve this problem.

According to an embodiment of the invention, a reference voltage controlling circuit and a guard trace disposed adjacent to the touch sensor panel are introduced in the touch controller, for assisting with noise reduction. In the embodiments of the invention, the guard trace disposed adjacent to the touch sensor panel may be further utilized for eliminating the electromagnetic interference (EMI).

Figure 4:
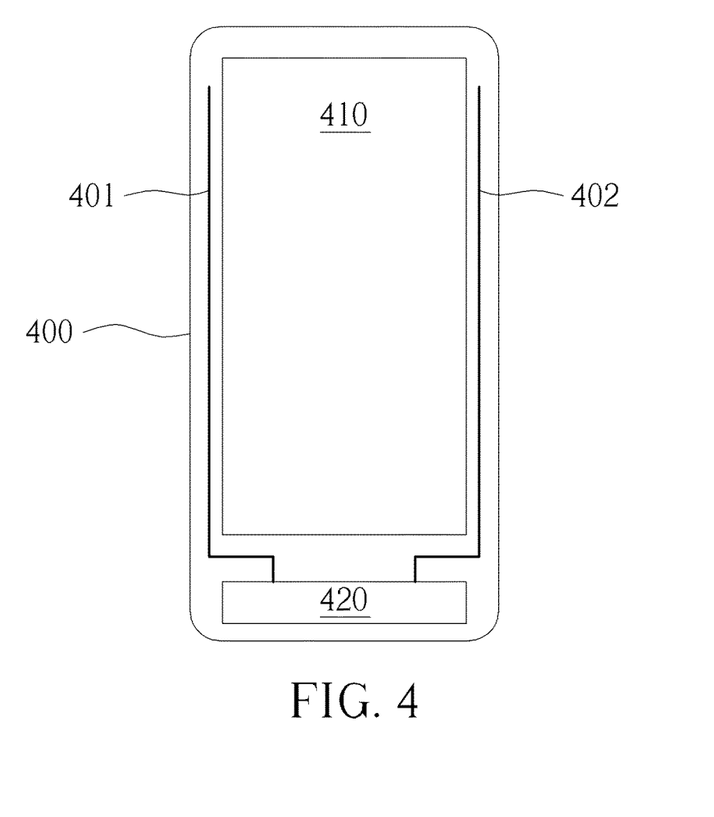
FIG. 4 is a schematic diagram showing the top view of an electronic device according to an embodiment of the invention.

FIG. 4 is a schematic diagram showing the top view of an electronic device according to an embodiment of the invention. The electronic device 400 with touch control and display functionalities may comprise one or more guard traces, such as the guard traces 401 and 402 distributed around the display and touch area 410 of the electronic device 400 and/or adjacent to the touch sensor panel and the display panel (not shown in FIG. 4). For example, the guard traces may be disposed nearby at least one side of the touch sensor panel and/or the display panel and extended along the at least one side of the touch sensor panel and/or the display panel. The touch sensor panel and the display panel are both disposed under and/or covered by the display and touch area 410. According to an embodiment of the invention, one or more of the guard traces may be coupled to the touch controller 420 and may be further introduced into the touch controller 420 to be connected to the sensing circuits in the touch controller. In the embodiments of the invention, the guard trace may be connected to one input node of the sensing circuits for assisting with noise reduction.

Figure 5:
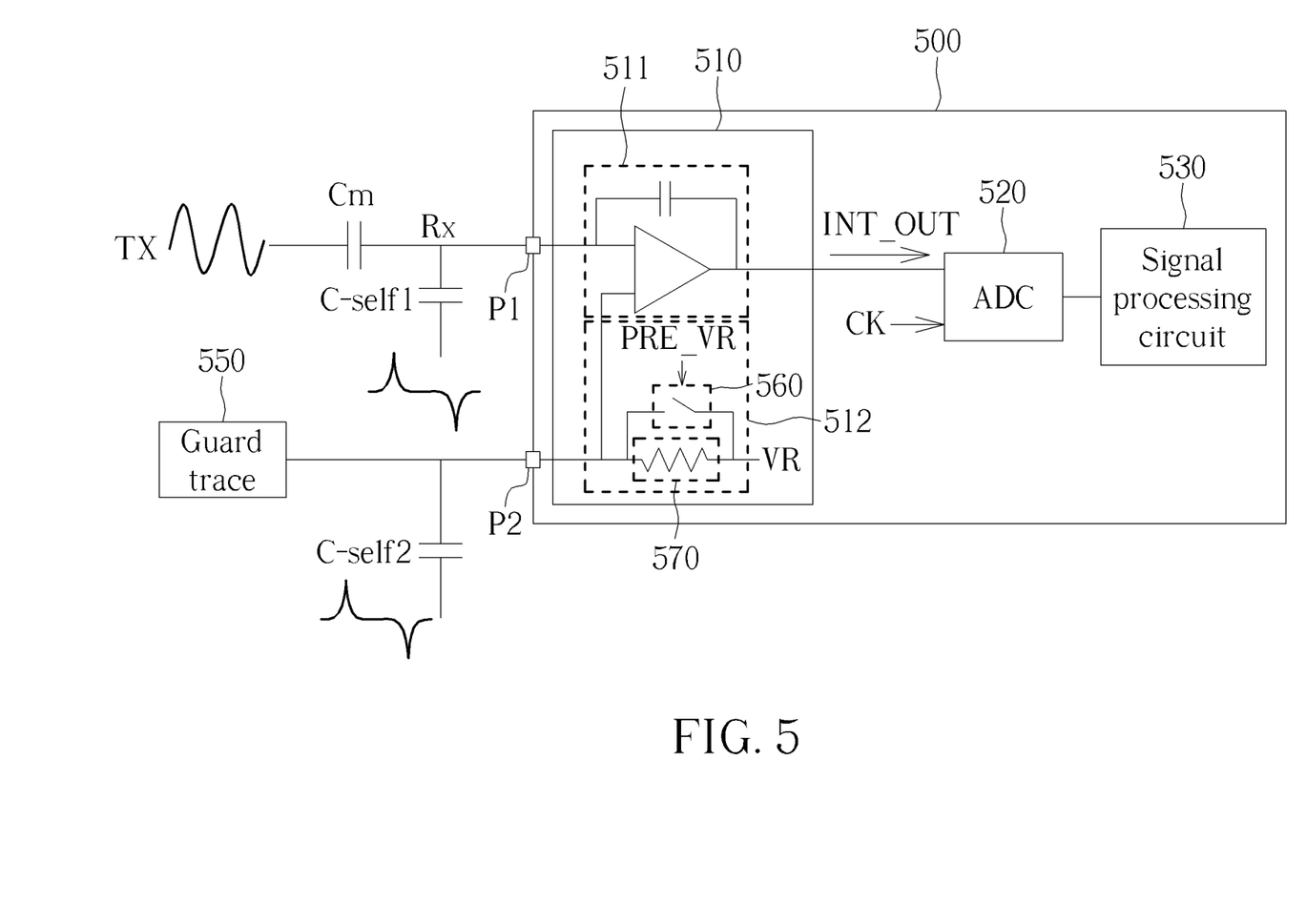
FIG. 5 shows an exemplary block diagram of a touch controller according to an embodiment of the invention.

FIG. 5 shows an exemplary block diagram of a touch controller according to an embodiment of the invention. The touch controller 500 may be coupled to a touch sensor panel (not shown in FIG. 5) and arranged to detect touch events on the touch sensor panel. The touch controller 500 may comprise a plurality of sensing circuits, such as the sensing circuit 510, an analog to digital converter (ADC) 520 and a signal processing circuit 530. Each sensing circuit is coupled to a sensing node of the touch sensor panel for receiving a sensing signal from an RX channel, where the word "TX" in FIG. 5 may represent the corresponding TX channel and the word "RX" in FIG. 5 may represent the corresponding RX channel. It should be noted that, in order to clarify the concept of the invention, FIG. 5 presents a simplified block diagram of a touch controller in which only the components relevant to the invention are shown, for example, only one sensing circuit is shown in FIG. 5. As will be readily appreciated by a person of ordinary skill in the art, a touch controller may further comprise other components not shown in FIG. 5 and configured for implementing the functions of touch sensing, detecting and recognizing, and related signal processing.

In addition, in should be noted that, although the ADC shown in FIG. 5 is not comprised in the sensing circuit, the invention should not be limited thereto. In some embodiments of the invention, the ADC may also be comprised in the sensing circuit as a part of the sensing circuit.

According to an embodiment of the invention, the sensing circuit 510 may comprise an integrator circuit 511 and a reference voltage controlling circuit 512. The integrator circuit 511 comprises a first input node coupled to the sensing node for receiving the sensing signal indicative of a voltage or an amount of charge on the corresponding RX channel, a second input node coupled to a guard trace 550 which is disposed adjacent to the touch sensor panel and an output node for outputting an integrated signal INT OUT. According to an embodiment of the invention, the touch controller 500 may be implemented as an integrated circuit (IC) and may be coupled to the touch sensor panel (e.g. coupled to one or more sensing nodes of the touch sensor panel) via one or more nodes, pins or pads, such as the pad P1, and coupled to the guard trace 550 via other node, pin or pad, such as the pad P2.

The integrator circuit 511 is arranged to accumulate the input quantity, such as a voltage or an amount of charge received from the sensing node, over a defined time to produce a representative output, such as the integrated signal INT OUT. The ADC 520 is coupled to the output node of the integrator circuit and arranged to receive the integrated signal INT OUT and a clock signal CK and convert the integrated signal according to the clock signal CK to generate a converted signal. The signal processing circuit 530 is coupled to the ADC 520 and arranged to receive the converted signal and process the converted signal to determine whether there is any touch event on the touch sensor panel, and to further recognize the touch events and the positions of the touch events on the touch sensor panel. The determination and recognition result may be further provided to a processor of an electronic device for interpreting the touch event and thereafter performing one or more operations based on the event.

According to a first embodiment of the invention, the reference voltage controlling circuit 512 may comprise a switch 560 and a resistor 570 coupled in parallel between the second input node of the integrator circuit 511 and a voltage source VR providing a reference voltage. It should be noted that in some embodiments of the invention, the voltage source VR may also be comprised in the reference voltage controlling circuit as a part of the reference voltage controlling circuit, and the invention is not limited to any specific implementation method. It should be further noted that in some embodiments of the invention, the reference voltage controlling circuit 512 may also be configured outside of the sensing circuit 510, and may be a common reference voltage controlling circuit coupled to and shared by all the sensing circuits in a touch controller, and the invention is not limited to any specific implementation method.

According to an embodiment of the invention, the reference voltage controlling circuit 512 is arranged to control the voltage provided at the second input node of the integrator circuit 511 to be biased at the reference voltage. In the embodiments of the invention, by further connecting the second input node of the integrator circuit 511 to the guard trace 550, the noise coupled onto the guard trace 550 can be utilized to reduce or even cancel the noise appeared in the sensing signal.

Figure 6:
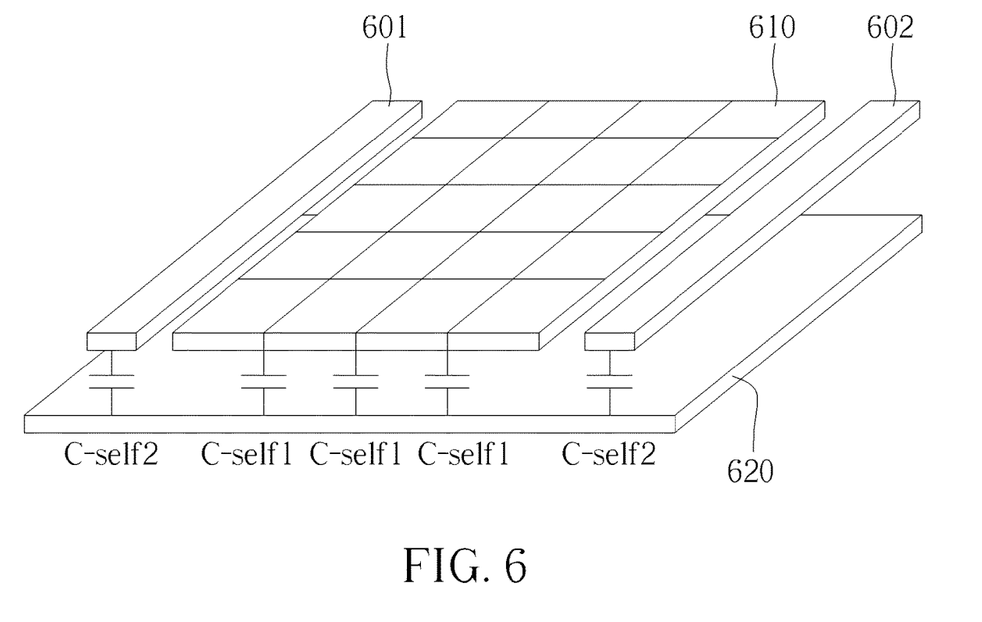
FIG. 6 is a schematic diagram showing the side view of an electronic device according to an embodiment of the invention.

FIG. 6 is a schematic diagram showing the side view of an electronic device according to an embodiment of the invention. In FIG. 6, the parasitic capacitance C-self1 represents the parasitic capacitance between the touch sensor panel 610 and a layer 620 of the display panel, for example but not limited to, the cathode layer of the display panel, and the parasitic capacitance C-self2 represents the parasitic capacitance between the guard traces 601 and 602, which are disposed adjacent to or around the touch sensor panel 610, and the layer 620 of the display panel. When noise is generated, for example, when the display panel is changing the screen to be displayed, the noise will be coupled to the touch sensor panel 610 via the parasitic capacitance C-self1 and will also be coupled to the guard traces 601 and 602 via the parasitic capacitance C-self2. The amount of noise generated on the touch sensor panel and the amount of noise generated on the guard traces may be different but similar, or substantially the same. In the embodiments of the invention, the noise on the guard trace can be utilized to reduce or even cancel the noise appeared in the sensing signal.

Referring back to FIG. 5, the parasitic capacitance C-self1 and the parasitic capacitance C-self2 are also shown in FIG. 5, for illustrating that the noise coupled to the first input node of the integrator circuit 511 is also coupled to the second input node of the integrator circuit 511 via the guard trace.

According to the embodiments of the invention, the status (e.g. being closed or opened) of the switch 560 is changed or controlled in response to a pre-charge control signal PRE_VR. The signal processing circuit 530 may be arranged to generate the pre-charge control signal PRE_VR for controlling the switch 560. In an embodiment of the invention, the switch 560 is closed during a pre-charge period in the beginning of a sensing period in response to the pre-charge control signal PRE_VR, so as to charge a voltage on the guard trace 550 to the reference voltage. When the switch 560 is closed, both the guard trace 550 and the second input node of the integrator circuit 511 are connected to the voltage source VR providing the reference voltage. The voltage on the guard trace 550 as well as the voltage at the second input node of the integrator circuit 511 will be charged to the reference voltage during the pre-charge period.

After the pre-charge period, for example, when the pre-charge period is ended, the switch 560 is opened. When the switch 560 is opened, both the guard trace 550 and the second input node of the integrator circuit 511 are disconnected from the voltage source VR. Therefore, when the switch 560 is opened, the second input node of the integrator circuit 511 is only connected to the guard trace 550.

According to an embodiment of the invention, the guard trace disposed adjacent to the touch sensor panel may be originally designed as a floating trace. Here, a floating trace means that it is not connected to any voltage source for providing a predetermined voltage. Therefore, the voltage on the floating trace is floating.

In the embodiments of the invention, the guard trace, such as the guard trace 550, will be connected to a voltage source, such as the voltage source VR, providing a predetermined voltage only when the switch 560 is closed, and will be a floating trace when switch 560 is opened.

When switch is opened, the voltage of the guard trace 550 is floating and will vary with the induced noise. Therefore, in the embodiments of the invention, the noise appeared in the guard trace is provided to the second input node of the integrator circuit 511 to cancel the noise appeared in the sensing signal.

It should be noted that in some embodiments of the invention, the guard trace disposed adjacent to the touch sensor panel may also be originally designed as a non-floating trace that it is connected or coupled to a voltage source for providing a predetermined voltage. For example, the guard trace disposed adjacent to the touch sensor panel may be originally designed as a non-floating trace connected or coupled to the ground. Therefore, in some other embodiments of the invention, the guard trace, such as the guard trace 550, will be connected to a voltage source, such as the voltage source VR, providing a predetermined voltage when the switch 560 is closed, and will be connected to another voltage source providing another predetermined voltage, such as the ground voltage, when switch 560 is opened.

Figure 7:
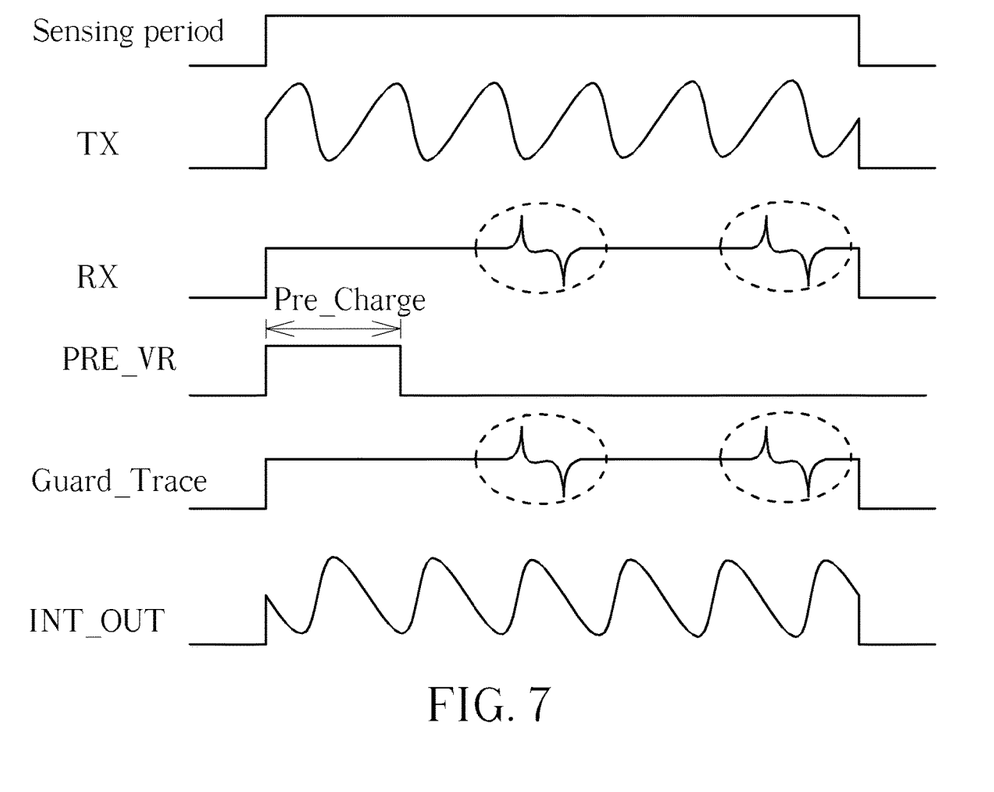
FIG. 7 shows exemplary signal waveforms in a sensing period according to an embodiment of the invention.

FIG. 7 shows exemplary signal waveforms in a sensing period according to an embodiment of the invention. In FIG. 7, the signal labeled with the word "TX" is the driving signal supplied by the TX driving circuit onto a TX line, the signal labeled with the word "RX" is the sensing signal generated on the sensing node and received by the sensing circuit, such as the sensing circuit 510, the signal labeled with the word "PRE_VR" is the pre-charge control signal, the signal labeled with the word "Guard_Trace" is the voltage signal on the guard trace, such as the guard trace 550, and the signal labeled with the word "INT OUT" is the signal output by the sensing circuit.

As shown in FIG. 7, in response to a predetermined voltage level, such as a high voltage level, of the pre-charge control signal PRE_VR during a pre-charge period Pre_Charge in the beginning of a sensing period, the switch is closed to charge a voltage on the guard trace to the reference voltage (represented by the word "VR" in FIG. 7) provided by the voltage source VR. After the pre-charge period Pre_Charge, the switch is opened in response to another predetermined voltage level, such as a low voltage level, of the pre-charge control signal PRE_VR.

After the pre-charge period Pre_Charge, the guard trace 550 may become a floating trace and the reference voltage is held on the guard trace 550 via the path provided by the resistor 570 and connecting to the voltage source VR. When noise is generated, the noise appears in the sensing signal received by the first input node of the sensing circuit will also appear in the voltage signal on the guard trace. In this manner, the noise can be reduced, cancelled or eliminated and will not appear in the integrated signal INT_OUT output by the sensing circuit.

Figure 8:
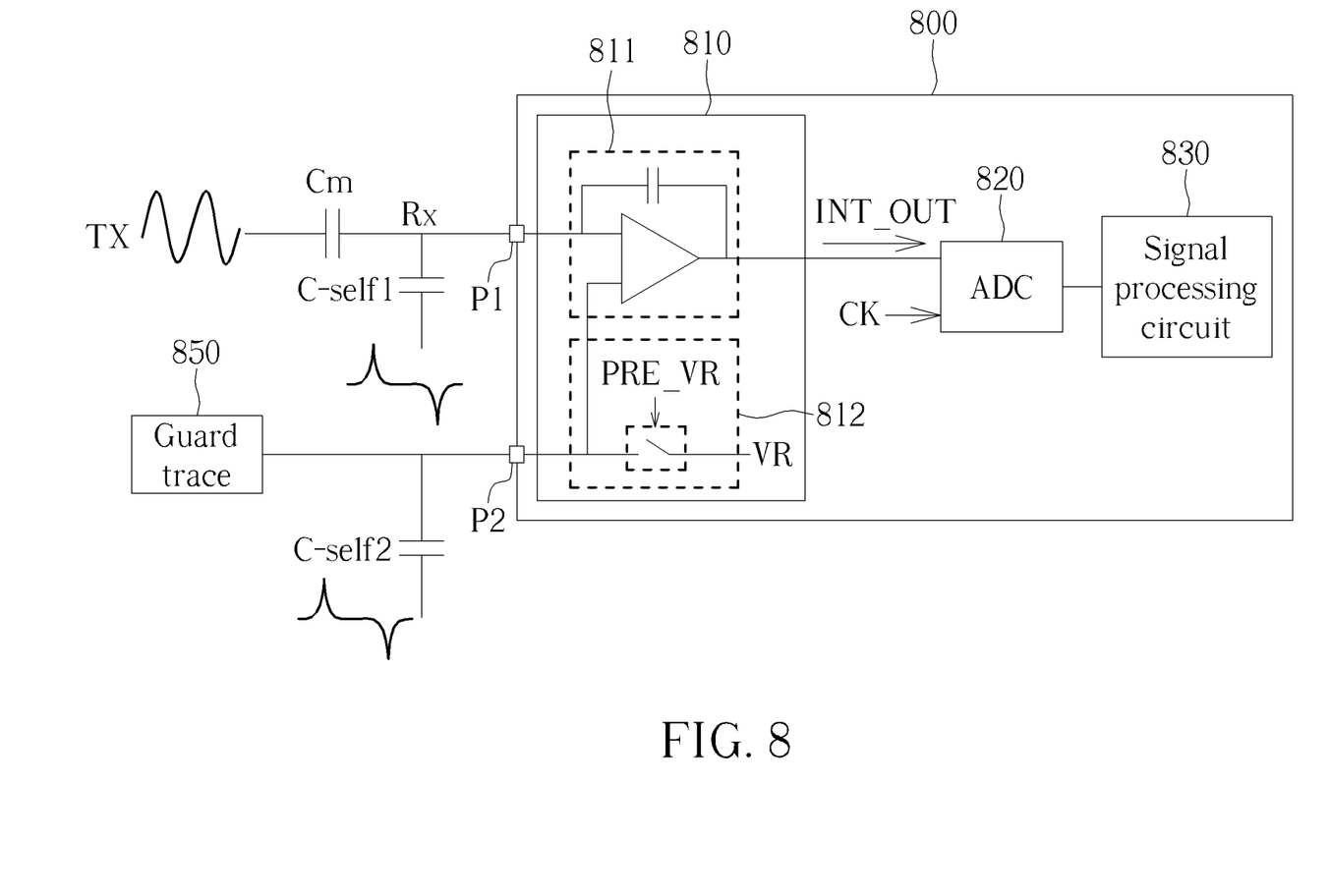
FIG. 8 shows an exemplary block diagram of a touch controller according to another embodiment of the invention.

FIG. 8 shows an exemplary block diagram of a touch controller according to another embodiment of the invention. The touch controller 800 may be coupled to a touch sensor panel (not shown in FIG. 8) and arranged to detect touch events on the touch sensor panel. The touch controller 800 may comprise a plurality of sensing circuits, such as the sensing circuit 810, an ADC 820 and a signal processing circuit 830. The sensing circuit 810 may comprise an integrator circuit 811 and a reference voltage controlling circuit 812. The integrator circuit 811 comprises a first input node coupled to the sensing node for receiving the sensing signal indicative of a voltage or an amount of charge on the corresponding RX channel, a second input node coupled to a guard trace 850 which is disposed adjacent to the touch sensor panel and an output node for outputting an integrated signal INT_OUT. It should be understood that since most of the elements shown in FIG. 8 are the same as or similar to those illustrated in FIG. 5, like elements are labeled with like reference numerals in FIG. 8, and description of such elements are omitted for brevity.

According to a second embodiment of the invention, the reference voltage controlling circuit 812 may comprise only a switch coupled between the second input node of the integrator circuit 811 and a voltage source VR providing a reference voltage.

In this embodiment of the invention, in response to a predetermined voltage level of the pre-charge control signal PRE_VR during a pre-charge period in the beginning of a sensing period, the switch in the reference voltage controlling circuit 812 is closed to charge a voltage on the guard trace to the reference voltage provided by the voltage source VR. After the pre-charge period, the switch in the reference voltage controlling circuit 812 is opened in response to another predetermined voltage level of the pre-charge control signal PRE_VR.

In this embodiment of the invention, although there is no resistor coupled between the guard trace 850 and the voltage source VR, the reference voltage will still be held on the guard trace via the capacitor C-self2. After the pre-charge period, the guard trace may become a floating trace. When noise is generated, the noise appears in the sensing signal received by the first input node of the sensing circuit will also appear in the voltage signal on the guard trace. In this manner, the noise can be reduced, cancelled or eliminated and will not appear in the integrated signal INT_OUT output by the sensing circuit.

In some implementations of the invention, the proposed circuit design of a touch controller being capable of reducing noise interference, such as the touch controller 500 and 800 illustrated above, may be comprised in a touch sensing device which further comprises one or more guard traces disposed adjacent to a touch sensor panel. In some other implementations of the invention, the proposed circuit design of a touch controller being capable of reducing noise interference, such as the touch controller 500 and 800 illustrated above, may be comprised in a touch sensing module which further comprises a touch sensor panel and one or more guard traces disposed adjacent to the touch sensor panel. By introducing the aforementioned reference voltage controlling circuit and guard trace in the touch controller, the noise coupled onto the guard trace can be utilized to reduce or even cancel the noise appeared in the sensing signal, and the aforementioned problem in the conventional design can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch controller, coupled to a touch sensor panel and arranged to detect touch events on the touch sensor panel, comprising:
   a sensing circuit, comprising:
      an integrator circuit, comprising:
         a first input node, coupled to a sensing node for receiving a sensing signal;
         a second input node, coupled to a guard trace disposed adjacent to the touch sensor panel; and
         an output node, outputting an integrated signal; and
      a reference voltage controlling circuit, comprising:
         a switch, coupled between the second input node of the integrator circuit and a voltage source providing a reference voltage; and
   a capacitor, coupled between the guard trace and the second input node of the integrator circuit
   wherein the switch is closed during a pre-charge period of a sensing period to charge a voltage on the guard trace to the reference voltage and is opened after the pre-charge period, wherein the pre-charge period occurs at the beginning of the sensing period and does not comprise the entire sensing period.

2. The touch controller of claim 1, further comprising:
   an analog to digital converter, coupled to the output node of the integrator circuit and arranged to receive the integrated signal and convert the integrated signal to generate a converted signal; and
   a signal processing circuit, coupled to the analog to digital converter and arranged to receive the converted signal and process the converted signal to determine whether there is any touch event on the touch sensor panel.

3. The touch controller of claim 1, wherein the reference voltage controlling circuit further comprises:
a resistor, coupled between the second input node of the integrator circuit and the voltage source.

4. The touch controller of claim 1, wherein the guard trace is a floating trace when the switch is opened.

5. The touch controller of claim 2, wherein the signal processing circuit is further arranged to generate a pre-charge control signal for controlling the switch to close during the pre-charge period of the sensing period.

6. A touch sensing device, comprising:
a guard trace, disposed adjacent to a touch sensor panel; and
a touch controller, coupled to the touch sensor panel and arranged to detect touch events on the touch sensor panel, comprising:
a sensing circuit, comprising:
an integrator circuit, comprising:
a first input node, coupled to a sensing node for receiving a sensing signal;
a second input node, coupled to the guard trace; and
an output node, outputting an integrated signal; and
a reference voltage controlling circuit, comprising:
a switch, coupled between the second input node of the integrator circuit and a voltage source providing a reference voltage; and
a capacitor, coupled between the guard trace and the second input node of the integrator circuit;
wherein the switch is closed during a pre-charge period of a sensing period to charge a voltage on the guard trace to the reference voltage and is opened after the pre-charge period, wherein the pre-charge period occurs at the beginning of the sensing period and does not comprise the entire sensing period.

7. The touch sensing device of claim 6, wherein the touch controller further comprises:
an analog to digital converter, coupled to the output node of the integrator circuit and arranged to receive the integrated signal and convert the integrated signal to generate a converted signal; and
a signal processing circuit, coupled to the analog to digital converter and arranged to receive the converted signal and process the converted signal to determine whether there is any touch event on the touch sensor panel.

8. The touch sensing device of claim 6, wherein the reference voltage controlling circuit further comprises:
a resistor, coupled between the second input node of the integrator circuit and the voltage source.

9. The touch sensing device of claim 6, wherein the guard trace is a floating trace when the switch is opened.

10. The touch sensing device of claim 7, wherein the signal processing circuit is further arranged to generate a pre-charge control signal for controlling the switch to close during the pre-charge period of the sensing period.

11. A touch sensing module, comprising:
a touch sensor panel;
a guard trace, disposed adjacent to the touch sensor panel; and
a touch controller, coupled to the touch sensor panel and arranged to detect touch events on the touch sensor panel, comprising:
a sensing circuit, comprising:
an integrator circuit, comprising:
a first input node, coupled to a sensing node for receiving a sensing signal;
a second input node, coupled to the guard trace; and
an output node, outputting an integrated signal; and
a reference voltage controlling circuit, comprising:
a switch, coupled between the second input node of the integrator circuit and a voltage source providing a reference voltage; and
a capacitor, coupled between the guard trace and the second input node of the integrator circuit;
wherein the switch is closed during a pre-charge period of a sensing period to charge a voltage on the guard trace to the reference voltage and is opened after the pre-charge period, wherein the pre-charge period occurs at the beginning of the sensing period and does not comprise the entire sensing period.

12. The touch sensing module of claim 11, wherein the touch controller further comprises:
an analog to digital converter, coupled to the output node of the integrator circuit and arranged to receive the integrated signal and convert the integrated signal to generate a converted signal; and
a signal processing circuit, coupled to the analog to digital converter and arranged to receive the converted signal and process the converted signal to determine whether there is any touch event on the touch sensor panel.

13. The touch sensing module of claim 11, wherein the reference voltage controlling circuit further comprises:
a resistor, coupled between the second input node of the integrator circuit and the voltage source.

14. The touch sensing module of claim 11, wherein the guard trace is a floating trace when the switch is opened.

15. The touch sensing module of claim 12, wherein the signal processing circuit is further arranged to generate a pre-charge control signal for controlling the switch to close during the pre-charge period of the sensing period.

* * * * *